(12) United States Patent
Chopra et al.

(10) Patent No.: US 9,964,141 B2
(45) Date of Patent: May 8, 2018

(54) BEARING ASSEMBLY WITH INNER RACE HAVING ONE OR MORE FLATS

(71) Applicant: Rexnord Industries, LLC, Milwaukee, WI (US)

(72) Inventors: Vivek Chopra, Simi Valley, CA (US); Majid Vigeh, Newbury Park, CA (US); Andrew Carter, Moorpark, CA (US)

(73) Assignee: REXNORD INDUSTRIES, LLC, Milwaukee, WI (US)

( * ) Notice: Subject to any disclaimer, the term of this patent is extended or adjusted under 35 U.S.C. 154(b) by 0 days. days.

(21) Appl. No.: 15/198,722

(22) Filed: Jun. 30, 2016

(65) Prior Publication Data
US 2018/0003217 A1  Jan. 4, 2018

(51) Int. Cl.
*F16C 11/06* (2006.01)

(52) U.S. Cl.
CPC ...... *F16C 11/0614* (2013.01); *F16C 11/0685* (2013.01)

(58) Field of Classification Search
CPC .............. F16C 11/0604; F16C 11/0614; F16C 11/0685; F16C 23/043; F16C 23/045; F16C 23/048
See application file for complete search history.

(56) References Cited

U.S. PATENT DOCUMENTS

| 3,371,398 | A | * | 3/1968 | Patterson | B21K 1/06 29/447 |
| 4,411,545 | A | * | 10/1983 | Roberge | F16C 11/0614 384/208 |
| 5,482,379 | A | * | 1/1996 | Harris | F16C 13/006 384/208 |

* cited by examiner

*Primary Examiner* — James Pilkington
(74) *Attorney, Agent, or Firm* — Quarles & Brady LLP

(57) ABSTRACT

A bearing assembly includes an outer race and an inner race. The outer race has a body extending between a pair of axial faces and defines a radially-inward facing bearing surface. The inner race is received in the outer race and has a radially-outward facing bearing surface that bears against the radially-inward facing bearing surface of the outer race. The radially-outward facing bearing surface has one or more flat surfaces removed from it. These flats on the inner race can reduce the dimensional entry requirements for insertion of the inner race into the outer race and either permits the receiving slots in the outer race to be reduced in dimension (thereby relatively thickening the wall of the outer race, which structurally strengthens the outer races) or permits the receiving slots to be eliminated altogether.

8 Claims, 5 Drawing Sheets

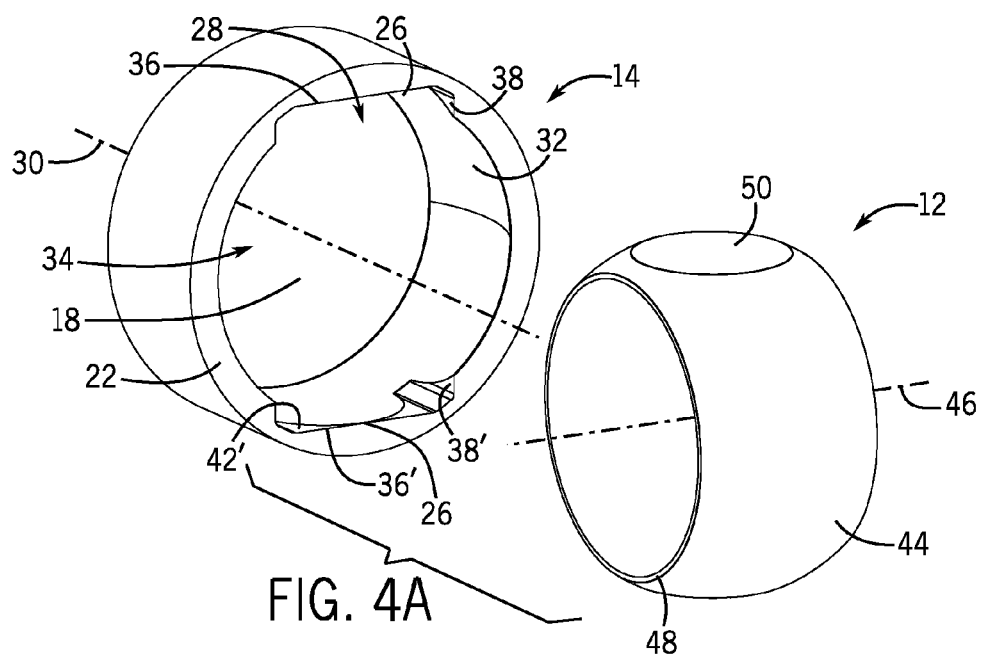
FIG. 4A
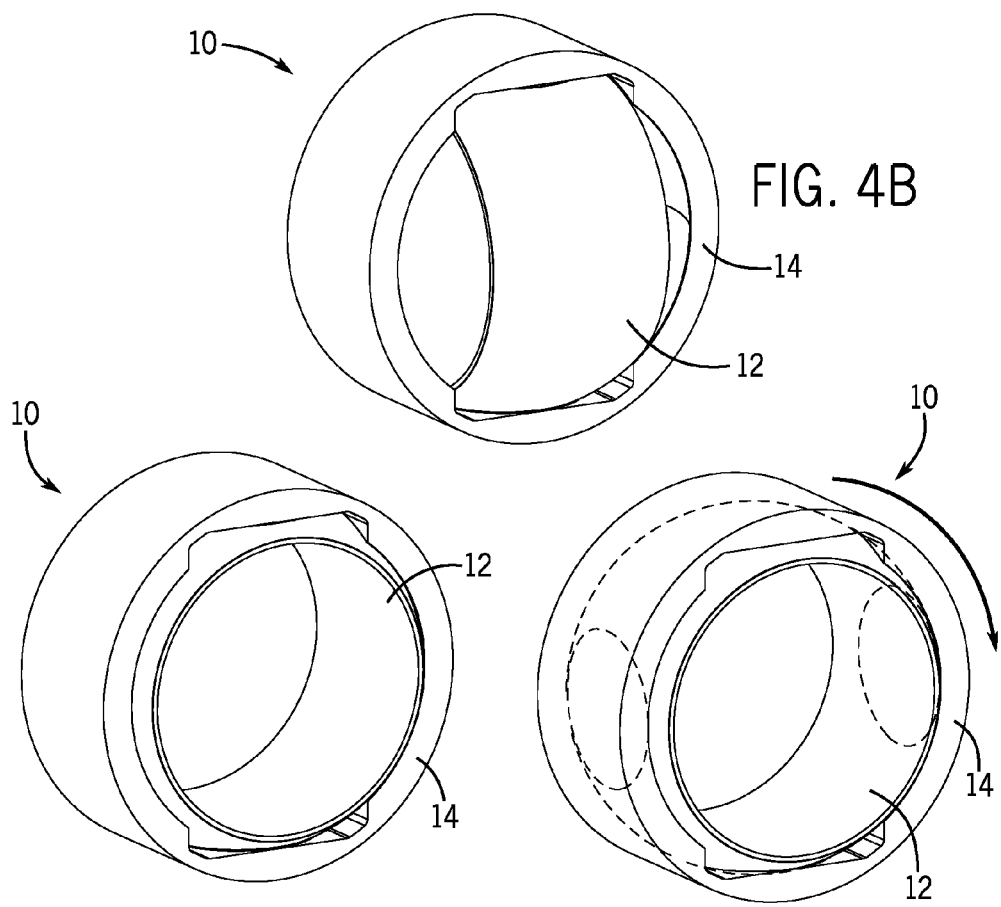
FIG. 4B
FIG. 4C
FIG. 4D

US 9,964,141 B2

BEARING ASSEMBLY WITH INNER RACE HAVING ONE OR MORE FLATS

CROSS-REFERENCE TO RELATED APPLICATION

Not applicable.

STATEMENT OF FEDERALLY SPONSORED RESEARCH OR DEVELOPMENT

Not applicable.

TECHNICAL FIELD

This disclosure relates to bearing assemblies and, more particularly, to bearing assemblies having one or more flats on an inner race.

BACKGROUND

Bearings are used in various applications in which one object rotates with respect to another. An inner race is received in an outer race such that a radially-outward facing bearing surface of the inner race bears on a radially-inward facing bearing surface of the outer race. Usually, the inner race and outer race are affixed to other objects which can rotate relative to one another and, in some instances, the bearing surfaces are shaped such that there may be some axial misalignment between the inner race and the outer race during operation.

In many instances, to allow this axial misalignment during operation of the bearing assembly, the inner race has a frusto-spherical bearing surface that is captured in a negatively-shaped frusto-spherical bearing surface of the outer race. Given this geometry of the bearing surfaces, to accommodate insertion of the inner race into the outer race during assembly, the outer race often includes a pair of opposing entry slots on one axial face such that the inner race can fit through the slots of the outer race when the inner race is rotated approximately ninety degrees relative to the central axis of the outer race (i.e., the insertion of the inner race into the outer race occurs in an orientation where the inner race is perpendicular to its preferred rotation axis, which would generally align with the axis of outer race). To provide the required clearance during insertion, the sides of the inner race are typically truncated to generally correspond to, but to be slightly smaller than, the slot width of the opposing entry slots. This truncation gives the inner race a frusto-spherical shape. Once the inner race is inserted into the outer race, the inner race is turned 90 degrees to align with the outer race and the inner race is then sealed into the outer race to prevent the ingress of debris into the bearing space. At this point, the slotted entry bearing is ready for operation.

SUMMARY

The pair of opposing entry slots in traditional slotted entry bearings locally reduces the wall thickness of the outer race in the volumes of the outer race in which these slots are formed. Among other things this can hinder the strength rating of the bearing and, more specifically, the outer race. To counteract the reduction in localized wall thickness and to maintain the necessary maximum capacity for the given bearing application, it may often be the case that the thickness of the outer race has to be thickened throughout to accommodate for the formation of the slots. This results in a larger, heavier, and more expensive final product. Particularly in instances in which the added weight is a significant consideration—for example, aerospace applications—increasing the mass and size of the bearing is a significant disadvantage.

An improved bearing assembly is disclosed herein that allows for the entry of the inner race into the outer race in a way that accommodates a relative reduction in the slot depth in the outer race or that accommodates an outright elimination of the slot(s) altogether. By reducing the slot depth or eliminating the slots, an overall wall thickness of the outer race can be reduced throughout (that is, a distance from an outwardly-facing surface to the inwardly-facing bearing surface or slot surfaces) since the thinnest section of the wall of the outer race (that is, the slots) is comparably increased meaning that the component does not, in aggregate need to be thickened to account for the points of weakness around the slot(s). The relatively increased local thickness at the slots improves the strength of this region and reduces deflection during mounting of the outer race at a given total assembly size. Furthermore, it may permit a reduction in the overall size requirements for the outer race to provide a sufficiently thick wall in all regions of the outer race, thereby resulting in a smaller, lighter, and less expensive final bearing assembly.

The improved bearing assembly also may result in increases in the overall bearing area at a given package size (i.e., bearing assembly size). That is to say, with the modifications described herein, a larger inner race can fit within an outer race having a pre-established outer surface profile without structurally compromising the outer race.

Additionally, the improved bearing can permit for controlled misalignment and rotation, if needed, and further can reduce concern of inner race indexing in the outer race during operation handling in such a manner that the inner race might disassemble.

According to one aspect, a slotted entry bearing assembly comprises an outer race and an inner race, in which the inner race is received in the outer race. The outer race has a body including a central opening defining a radially-inward facing bearing surface and the body extends between a pair of axial faces. At least one of the axial faces includes a pair of opposing entry slots (although in some instances and, as will be described in greater detail below, there may be fewer than two slots or no slots at all). The inner race includes a radially-outward facing bearing surface, which is configured to bear against the radially-inward facing bearing surface of the outer race during operation. Notably, the radially-outward facing bearing surface of the inner race has a pair of opposing flat surfaces formed therein (although in some instances and as will be described in greater detail below, there may be just one flat or more than two flats).

The flat surface(s) on the radially-outward facing bearing surface of the inner race can accommodate or facilitate a reduction in a distance between the pair of opposing entry slots of the outer race or potentially result in the outright elimination of the entry slots. Put a slightly different way, the pair of opposing flat surfaces of the inner race may define an inner race flat-to-flat distance therebetween, the pair of opposing entry slots of the outer race may each have a flat slot surface defining an outer race flat-to-flat distance therebetween, and the inner race flat-to-flat distance may correspond to the outer race flat-to-flat distance such that the inner race flat-to-flat distance is slightly less than the outer race flat-to-flat distance to allow the inner race to be slidably inserted into the outer race through the pair of opposing entry slots. Effectively, the presence of the flats on the inner race may permit a relative reduction in the distance between the pair of opposing entry slots (i.e., the outer race flat-to-flat distance) that can create a relative increase in the local thickness of the wall of the outer race at the slot avoiding an overall increase an outer dimension of the outer race to increase the wall thickness in this region of comparable thinness.

In many instances, the pair of opposing flat surfaces may be parallel to one another, and may further be perpendicular to a radial axis of the inner race. This can help to maximize the reduction in slot depth, but other flat arrangements on the inner race might also be employed. Furthermore, each flat may be entirely delimited by surrounding bearing surfaces or the flat may extend to the axial ends of the inner race in sections.

Otherwise, the inner and outer races may have other features characteristic of races. As one example, one or both of the inner race and the outer race may be annular in shape. In the case of the inner race, a central opening may be present to accommodate reception of a shaft or another object, while the outer surface of the outer race may be adapted to be received in a housing or an opening or between other objects (for example, clamping halves). In many instances, the outer race and/or the inner race may be made of a metallic material and either a lubricant may be received therebetween or the bearing surfaces and materials selected to have favorable tribological properties.

According to another aspect, a bearing assembly comprises an outer race and an inner race, in which the inner race is received in the outer race. The outer race has a body extending between a pair of axial faces and a central opening defining a radially-inward facing bearing surface. The inner race has a radially-outward facing bearing surface configured to bear against the radially-inward facing bearing surface of the outer race during operation. The radially-outward facing bearing surface includes at least one flat surface formed therein.

Among other things, the flat(s) of the radially-outward facing bearing surface may provide clearance for insertion of the inner race into the outer race in particular orientations of the inner race relative to the outer race. In many forms, the flat surface(s) may be a pair of flat surfaces, which may further be parallel to one another. However, in other forms, it is contemplated that a single flat surface may provide clearance for insertion of the inner race into the central space of the outer race.

In some instances, an absence of an entry slot on the outer race may accommodate an increase in a thickness (overall or localized) of a radial wall of the outer race without increasing an outer dimension of the outer race. In instances in which the flat(s) on the inner race are large enough, such a slot or slots in the outer race might be eliminated altogether. However, as noted above, at least one of the pair of axial faces may include an entry slot or slots in some forms.

According to still another aspect, a method of manufacturing a bearing assembly is disclosed. The method includes the step of inserting an inner race into a central space of an outer race. The outer race is configured to receive the inner race through a central opening. The inner race includes a radially-outward facing surface and at least one flat surface formed therein. The inner race is then rotated approximately ninety degrees within the central space of the outer race. Due to the geometrical constraints of the inner race and the outer race, this rotation effectively locks or retains the inner race within the outer race.

As above, in some forms, the outer race may include a pair of axial faces, at least one of which includes one or more entry slots (potentially including a pair of opposing entry slots in some forms). The step of inserting the inner race into the central space of the outer race may be done by inserting the inner race through the entry slot(s).

In some forms, the inner race may define a central axis of the inner race, the central space of the outer race may define a central axis of the outer race, and the step of inserting the inner race into the central space of the outer race may involve the central axis of the inner race being perpendicular to the central axis of the outer race during insertion.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

BRIEF DESCRIPTION OF THE FIGURES

FIGS. 4A through 4D illustrate the various steps of assembly of the inner race into the outer race to form the slotted entry bearing assembly of FIG. 1A.

DETAILED DESCRIPTION

Figure 1A:
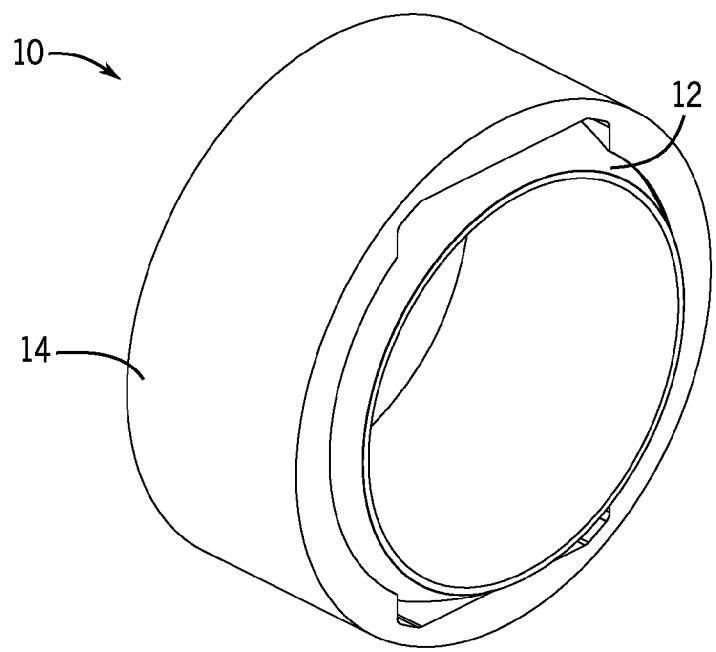
FIG. 1A is a perspective view of a slotted entry bearing assembly.
Figure 1B:
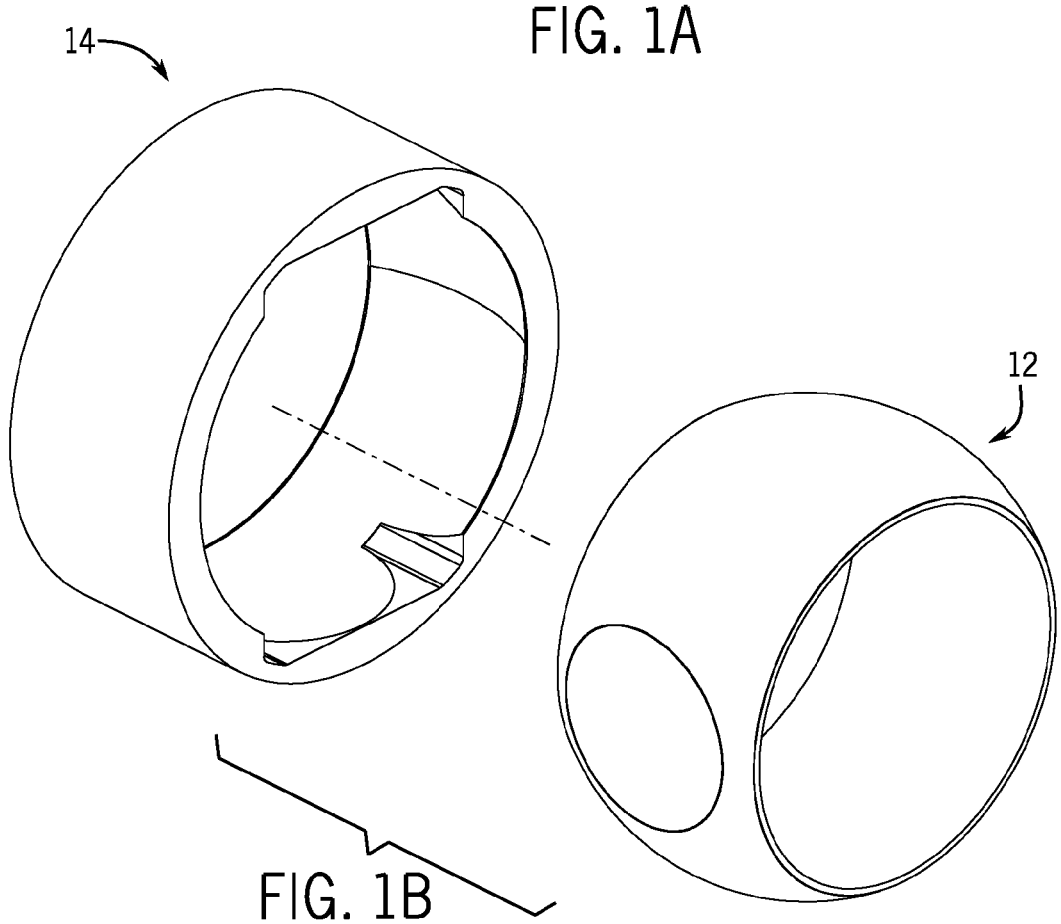
FIG. 1B is an exploded perspective view of the slotted entry bearing assembly of FIG. 1 showing the inner race apart from the outer race.

Referring first to FIGS. 1A and 1B, a slotted entry bearing assembly 10 is illustrated including an inner race 12 and an outer race 14 assembled and with parts exploded from one another, respectively. A slotted entry bearing assembly 10 of this type can be used to provide low friction rotatable connections between components, while permitting axial misalignment during rotation or operation. The structure of the outer race 14 and the inner race 12 will each now be described in greater detail.

Figure 2A:
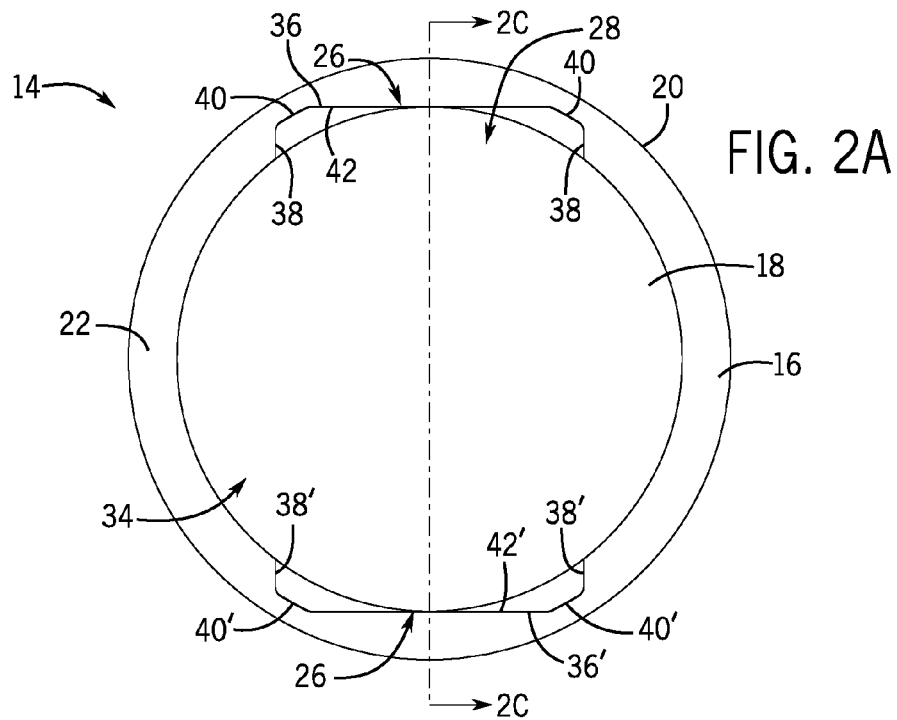
FIG. 2A is a front elevation view of the axial face of the outer race of FIGS. 1A and 1B showing a pair of opposing entry slots without the inner race received therein.
Figure 2B:
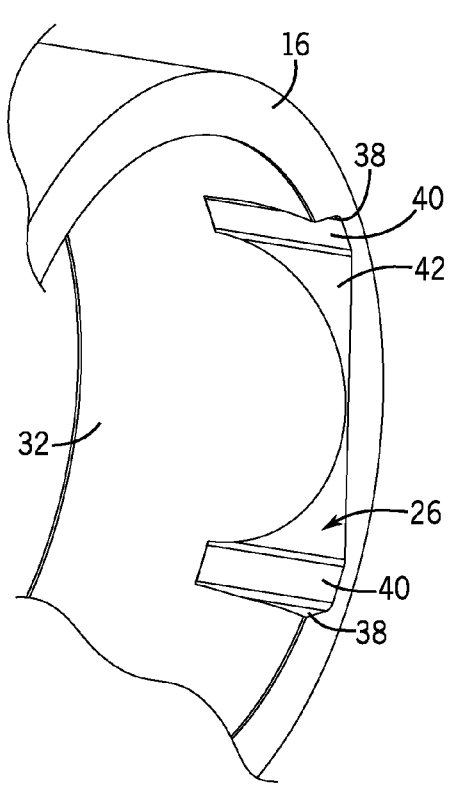
FIG. 2B is a detailed perspective view of one of the pair of opposing entry slots of the outer race of FIG. 2B.
Figure 2C:
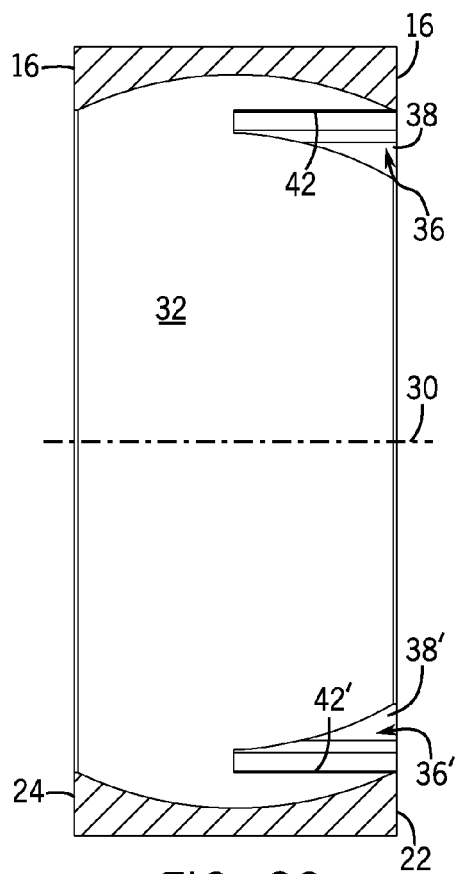
FIG. 2C is a cross-sectional side view taken along line 2C-2C of FIG. 2A extending through the slots of the outer race.

Now with reference to FIGS. 2A through 2C, the outer race 14 of the slotted entry bearing assembly 10 is generally annular in shape and may be made of a metallic material. The outer race 14 includes two axial faces 16, a central opening 18, and a radially-outward facing surface 20. The two axial faces 16 include a front slotted face 22 and a back face 24. The front slotted face 22 includes a pair of opposing entry slots 26 forming a loader slot area 28 and a portion of the central opening 18. The central opening 18 of the outer race 14 extends axially through the outer race 14 from the front slotted face 22 to the back face 24 and defines a central axis 30 of the outer race 14. The central opening 18 of the outer race 14 also includes a radially-inward facing bearing surface 32 forming a central space 34 configured to receive the inner race 12 through the loader slot area 28 formed by the pair of opposing entry slots 26 as will be described in greater detail below.

The pair of opposing entry slots 26 is recessed into the front slotted face 22 approximately half the distance through the outer race 14 towards the back face 24. The pair of opposing entry slots 26 includes a first slot 36 and a second slot 36'. The first and second slots 36, 36' are symmetric, and the following description of the first slot 36 also applies to the second slot 36', with like parts on the second slot 36' labeled in the prime series.

The first slot 36 includes two opposing lateral slot faces 38 separated by a distance therebetween, two angled slot faces 40, and a radially-inward facing flat surface 42 that is perpendicular to the radial direction at its centerline. The various surfaces of the slot 36 are configured to receive the inner race 12 therebetween during the insertion of the inner race 12 into the outer race 14, as also described below with respect to FIGS. 4A through 4D.

Although the illustrated outer race 14 includes a pair of opposing entry slots 26, it is contemplated that there may be instances where the outer race 14 could have one slot or more than two slots to permit multiple orientations for entry of the inner race. It is further contemplated that there may be other instances where the outer race 14 may not have any slots as will be illustrated below in FIGS. 5A through 5C.

Figure 3A:
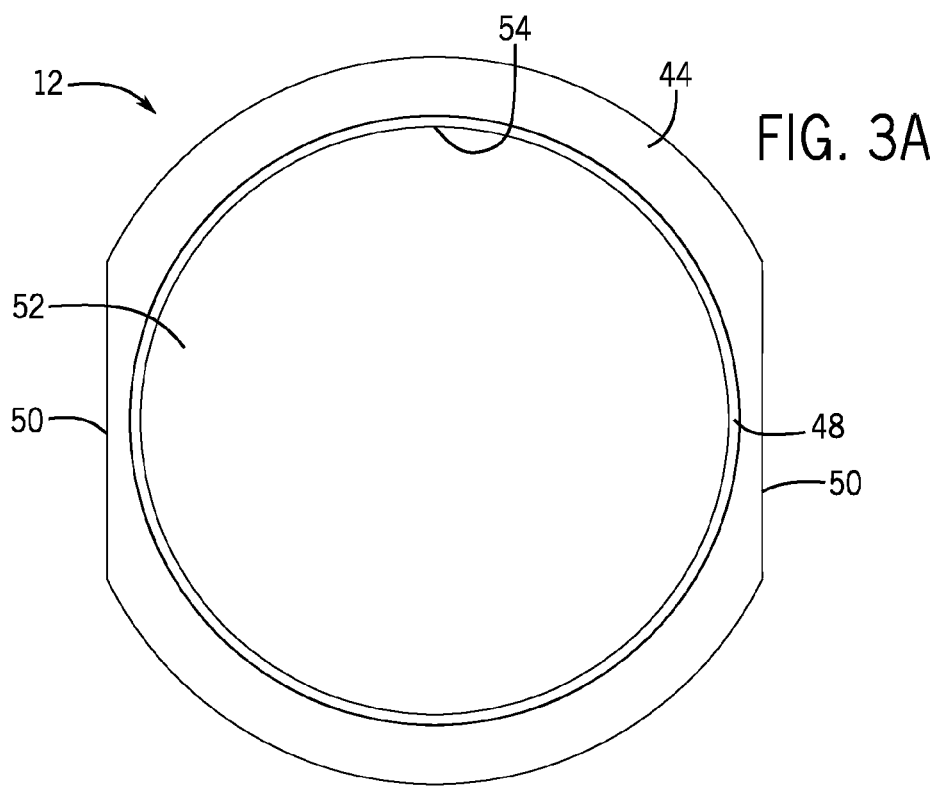
FIG. 3A is a front elevation view of the inner race with the flats extending perpendicular to the plane of the page.
Figure 3B:
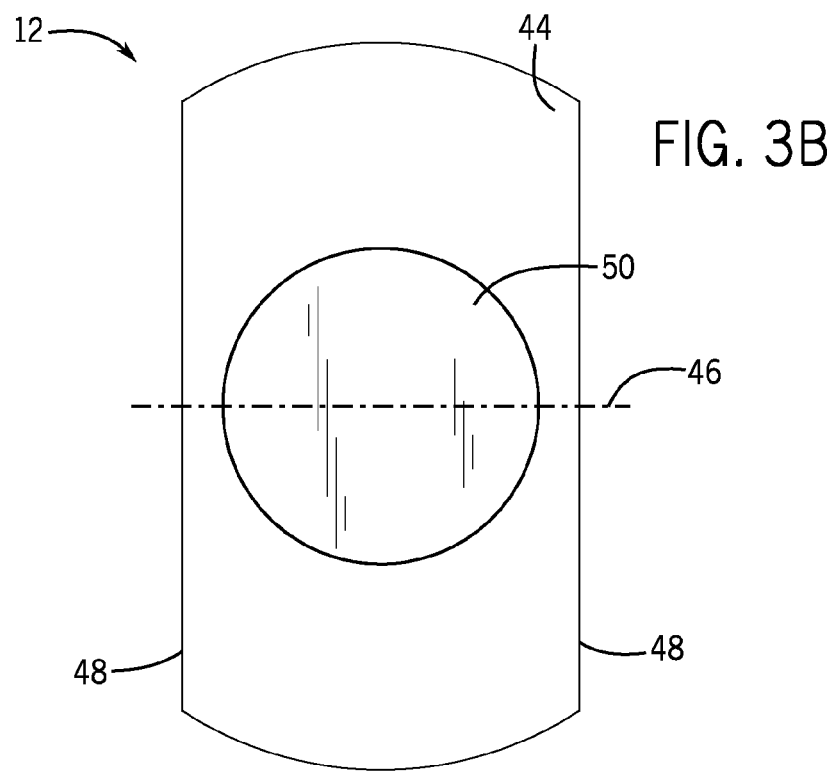
FIG. 3B is a side elevation view of the inner race showing one of the flats extending in the plane of the page.

Referring now to FIGS. 3A and 3B, the inner race 12 of the slotted entry bearing assembly 10 may be made of a metallic material and may also be generally annular in shape. The inner race 12 includes a radially-outward facing bearing surface 44 having a central axis 46 and two axial end surfaces 48 perpendicular to the central axis 46. The radially-outward facing bearing surface 44 defines a substantially spherical shape. The two axial surfaces 48 truncate the radially-outward facing bearing surface 44 to give the radially-outward facing bearing surface 44 a frusto-spherical shape.

This frusto-spherical shape of the radially-outward facing bearing surface 44 is further truncated by two opposing flat surfaces 50 formed therein. As illustrated, the two opposing flat surfaces 50 are parallel to each other and each of the two opposing flat surfaces 50 are perpendicular to a radial line extending from the central axis 46. These flat surfaces 50 may be formed in a number of ways including, but not limited to, milling the surfaces into an otherwise frusto-spherical bearing surface.

A central opening 52 extends along the central axis 46 from one of the axial surfaces 48 to the other. This central opening 52 is illustrated as being substantially round cylindrical in shape (for reception of a pin, rod, or so forth), but may also have other forms or shapes (for example, may be splined or have other forms or shapes to permit positive rotary engagement).

Although the illustrated embodiment has an inner race 12 with a radially-outward facing bearing surface 44 having two opposing flat surfaces 50 removed therefrom, the radially-outward facing bearing surface 44 could alternatively have one or more than two surfaces removed therefrom. It is further contemplated that, although the given embodiment includes two opposing flat surfaces 50 that are parallel to one another and perpendicular to a radial axis extending from the central axis 46, there could be instances where the two opposing flat surfaces 50 may not be parallel to one another and/or may not be perpendicular to a radial axis extending from the central axis 46.

Among other things, the presence of the flats 50 on the inner race 12 reduces the dimensional entry requirements for the insertion of the inner race into the slots 26 of the outer race 14. Effectively, by removing material from the bearing surface of the inner race 12, material may be added to the outer race 14. This "transfer" of material enables for a relative adjustment in wall thicknesses between the two parts, assuming a set package or assembly size for the bearing. It may also be used to increase the bearing surface area between the radially-outward facing bearing surface 44 of the inner race 12 and the radially-inward facing bearing surface 32 of the outer race 14 by permitting a relative increase in the diameter of the inner race 12 without reducing the minimum wall thickness of the outer race 14. Likewise, this construction might enable the overall package size of the bearing assembly to be reduced without reducing the minimum wall thickness of the outer race 14 in the region of any slots.

Turning now to FIGS. 4A through 4D, a method for the assembly of the slotted entry bearing assembly 10 is illustrated.

FIG. 4A shows how the inner race 12 is inserted into the outer race 14. The inner race 12 and the outer race 14 are initially provided separately. The inner race 12 is oriented so that the central axis 46 of the inner race 12 and the central axis 30 of the outer race 14 are perpendicular and the flats 50 of the inner race 12 align with the major flat surfaces 42 and 42' of the slots 26 of the outer race 14.

At this insertion orientation, the inner race 12 is then inserted through the loader slot area 28 on the front slotted face 22 of the outer race 14, with the two axial surfaces 48 of the inner race 12 being substantially parallel to the two opposing slot faces 38 of the first slot 36 and the two opposing slot faces 38' of the second slot 36', being fully inserted when the radially-outward facing bearing surface 44 of the inner race 12 contacts the radially-inward facing bearing surface 32 of the central opening 18 of the outer race 14 as shown in FIG. 4B.

While the inner race 12 is being inserted into the outer race 14, the two opposing flat surfaces 50 can provide extra clearance that would otherwise need to be included in the pair of opposing entry slots 26 (e.g., by additional removal of material in the slots as traditionally has been done). The reduction in depth of the pair of opposing entry slots 26 increases the local minimum thickness in the wall of the outer race 14 in the region of the slots 26. Traditionally, any added depth to the slots—resulting in a local point of weakness due to the thinned wall—has needed to be counteracted by increasing the overall thickness of the outer race 14. However, the two opposing flat surfaces 50 allow for the pair of opposing entry slots 26 to have a smaller depth (or be outright eliminated), while still providing sufficient clearance during insertion. This effectively minimizes or inhibits the reduction in thickness required by the pair of opposing entry slots 26. Therefore, the slotted entry bearing assembly 10 maintains a higher maximum capacity without increasing the overall thickness of the outer race 14.

It should further be appreciated that the radially-inward facing bearing surface of the outer race is generally reduced in surface area by an increased depth in the pair of opposing entry slots. In the illustrated embodiment, with the two opposing flat surfaces 50 allowing for the pair of opposing entry slots 26 to have a smaller depth, the radially-inward facing bearing surface 32 is allowed to maintain more of its surface area with the bearing surface 44 of the inner race 12. This increase in surface area for the bearing further increases the maximum capacity for the bearing assembly.

Returning now to the method of assembly, from FIG. 4B to 4C, the inner race 12 is rotated ninety degrees inside the central space 34 of the outer race 14 to the position shown in FIG. 4C, so the central axis 46 of the inner race 12 is coaxial with the central axis 30 of the outer race 14. The orientation shown in FIG. 4C effectively locks the inner race 12 within the central space 34 of the outer race 14 due to the geometrical constraints of the bearing surfaces of the inner race 12 and the outer race 14 such that the inner race 12 cannot simply translate out of the central opening 26 of the outer race 14.

Once the central axis 30 of the outer race 14 and the central axis 46 of the inner race 12 are aligned, the inner race 12 may be rotated approximately ninety degrees about its central axis 46, so that the two opposing flat surfaces 50 are positioned perpendicular to the pair of opposing entry slots 26, as shown in FIG. 4D. This positioning may reduce the likelihood of the inner race 12 rotating to the insertion orientation of the slotted entry bearing assembly 10, as described above and may accommodate the formation of the seal in the slots 26.

In many instances, after achieving a configuration similar to the one illustrated in FIG. 4D, a sealing material may be filled into the pair of opposing entry slots 26. The seal can prevent undesired debris from entering the inter-race bearing area of the slotted entry bearing assembly 10 during operation by sealing the entry way of the slots 26 and, furthermore, can prevent the inner race 12 from being removed from the outer race 14. This seal material should adhere to the outer race 14, but not the inner race 12 and so it is possible that the outer race 14 may be adapted to receive the seal material (for example, be roughened), while the inner race 12 may be adapted to slide past the seal material (for example, the inner race 12 may have a release material received on the exposed bearing surface 44 prior to forming the seal so that the sealant material does not adhere to the bearing surface 44).

During operation, the inner race 12 rotates relative to the outer race 14 with the radially-outward facing bearing surface 44 of the inner race 12 bearing on the radially-inward facing bearing surface 32 of the outer race 14. The frusto-spherical shape of the inner race 12 may allow for the inner race 12 and the outer race 14 to rotate in a misaligned position. The flats 50 remain substantially in the space between the bearing surfaces 32 and 44 and would not be exposed to the surrounding environment.

Figure 5A:
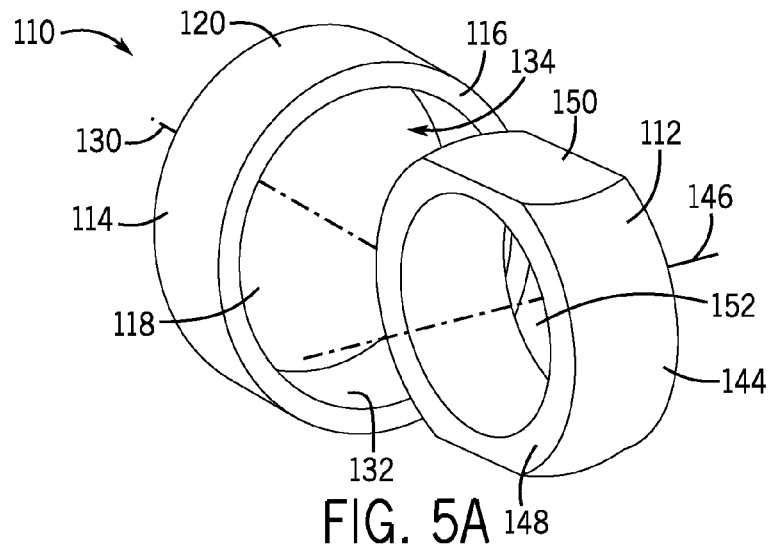
FIGS. 5A through 5C illustrate an alternative embodiment in which an inner race with flats is received in an outer race, but in which the outer race does not have opposing entry slots.
Figure 5B:
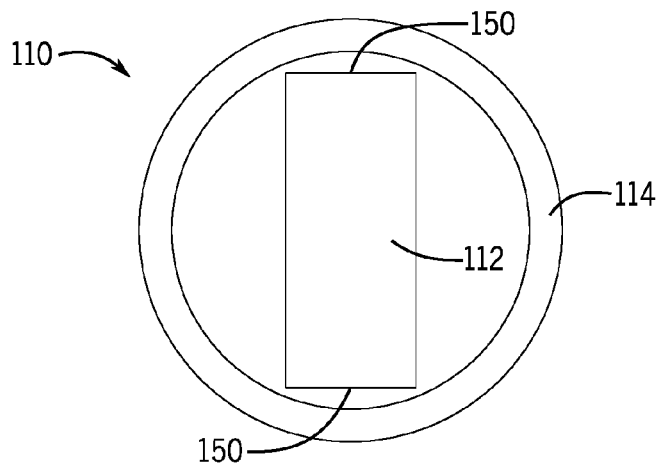
Figure 5C:
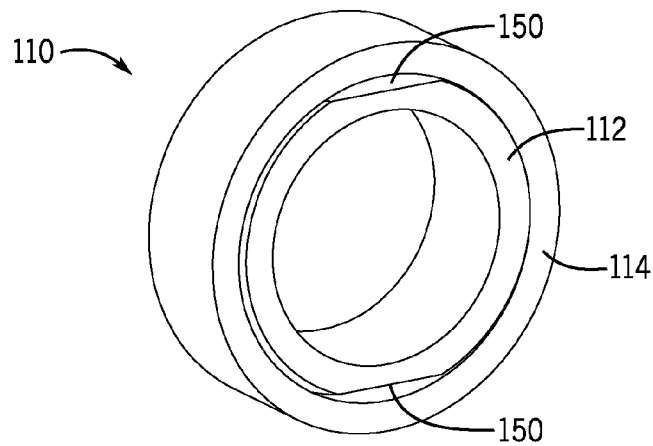

Referring now to FIGS. 5A through 5C, an alternative bearing assembly 110 is illustrated that also employs flats on the inner race to accommodate entry of the inner race into the outer race. The alternative bearing assembly 110 is configured almost identically to the previously discussed slotted entry bearing assembly 10, with like parts labeled in the one hundred series. However, it will be appreciated and understood that in FIGS. 5A through 5C, the outer race 114 does not have any entry slots as in the previously-described embodiment.

The alternative bearing assembly 110 again includes an inner race 112 and an outer race 114. The outer race 114 includes two axial faces 116, a radially-outward facing surface 120, and a central opening 118 including a radially-inward facing bearing surface 132 which is negatively frusto-spherically shaped. Notably, in this embodiment, neither of the two axial faces 116 includes a pair of opposing entry slots 26 as were shown in the slotted entry bearing assembly 10 above. The central opening 118 of the outer race 114 extends through the outer race 114, between the two axial faces 116, and defines a central axis 130 of the outer race 114. The radially-inward facing bearing surface 132 forms a central space 134 configured to receive the inner race 112.

The inner race 112 of the alternative bearing assembly 110 includes a radially-outward facing bearing surface 144 having a central axis 146, a central opening 152, and two axial surfaces 148 opposite each other and perpendicular to the central axis 146. The radially-outward facing bearing surface 144 defines a substantially spherically-segmented shape and further includes two opposing flat surfaces 150 formed therein, although these flats 150 extend all the way to the axial surfaces 148, unlike the flats 50 from the previous embodiment. The two opposing flat surfaces 150 and the two axial surfaces 148 effectively truncate the radially-outward facing bearing surface 144 to give the inner race 112 a pair of frusto-spherical shaped bearing surfaces 144 separated by the flats 150.

As can be seen in FIGS. 5A through 5C, an inner race 112 having a bearing surface 144 that includes is frusto-spherically shaped sections can be received into an outer race 114 having a correspondingly-shaped receiving bearing surface 132 in a manner similar to that illustrated in FIGS. 4A through 4D, except that, instead of receiving the inner race in a slotted area, the flats 150 of the inner race 112 provide all the necessary clearance for entry (shown in FIGS. 5A and 5B with the axis of the respective races 112 and 114 perpendicular to one another during insertion) prior to rotation to the assembled position of FIG. 5C.

According, an improved bearing assembly is disclosed in which the addition of one or more flats can be used to add additional space for the entry of the inner race into an outer race. By virtue of this flat or these flats, the depth of corresponding slot(s) in the outer race can be reduced or the slot(s) eliminated altogether. This may be potentially used to thicken the walls of the outer race at a given assembly size, to increase the bearing area at a given bearing size, and to reduce the assembly size at a given outer race wall thickness. It also helps to reduce exiting of the inner race from the outer race via indexing because both the flats and slots in some instances need to be in alignment to permit disassembly or removal of the inner race from the outer race.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A slotted entry bearing assembly comprising:
   an outer race having a body extending between a pair of axial faces in which at least one of the pair of axial faces includes a pair of opposing entry slots each having a flat slot surface defining an outer race flat-to-flat distance therebetween, and the outer race having a central opening defining a radially-inward facing bearing surface; and
   an inner race received in the outer race, the inner race having a radially-outward facing bearing surface bearing against the radially-inward facing bearing surface of the outer race, wherein the radially-outward facing bearing surface of the inner race has a pair of opposing flat surfaces formed therein, the pair of opposing flat surfaces being parallel and defining an inner race flat-to-flat distance therebetween;

wherein the inner race flat-to-flat distance corresponds to the outer race flat-to-flat distance.

2. The slotted entry bearing assembly of claim 1, wherein the pair of opposing flat surfaces are each perpendicular to a radial axis of the inner race.

3. The slotted entry bearing assembly of claim 1, wherein the outer race is annular in shape.

4. The slotted entry bearing assembly of claim 1, wherein the inner race includes a central opening.

5. The slotted entry bearing assembly of claim 1, wherein the inner race and the outer race are made of a metallic material.

6. A method of manufacturing a bearing assembly, the method comprising:
　inserting an inner race into a central space of an outer race, the outer race having a pair of opposing entry slots each having a flat slot surface defining an outer race flat-to-flat distance therebetween and the outer race being configured to receive the inner race through a central opening, the inner race having a radially-outward facing surface with a pair of opposing flat surfaces thereon in which the pair of opposing flat surfaces are parallel to one another and define an inner race flat-to-flat distance therebetween, and wherein the inner race flat-to-flat distance corresponds to the outer race flat-to-flat distance; and
　rotating the inner race approximately ninety degrees within the central space, effectively locking the inner race within the outer race.

7. The method of claim 6, wherein the step of inserting the inner race into the central space of the outer race is done by inserting the inner race through the pair of opposing entry slots.

8. The method of claim 6, wherein the inner race defines a central axis of the inner race, the central space of the outer race defines a central axis of the outer race, and the step of inserting the inner race into the central space of the outer race involves the central axis of the inner race being perpendicular to the central axis of the outer race.

\* \* \* \* \*